United States Patent

Rosen

[11] 3,945,729
[45] Mar. 23, 1976

[54] COMBINED RANGING AND COLOR SENSOR

[75] Inventor: Charles A. Rosen, Atherton, Calif.

[73] Assignee: Stanford Research Institute, Menlo Park, Calif.

[22] Filed: Dec. 30, 1974

[21] Appl. No.: 537,674

[52] U.S. Cl. .................. 356/5; 356/178; 356/195; 250/226; 209/111.5; 209/111.6
[51] Int. Cl.² .................. G01C 3/08; B07C 5/342
[58] Field of Search .................. 356/178, 195, 4, 5; 250/226; 340/146.3 B; 209/111.6, 111.5

[56] References Cited
UNITED STATES PATENTS

| | | | |
|---|---|---|---|
| 3,229,566 | 1/1966 | Hutchinson et al. | 250/226 |
| 3,476,132 | 11/1969 | Gebel | 209/111.6 |
| 3,525,571 | 8/1970 | Gebel | 356/178 |
| 3,625,619 | 12/1971 | Scholdstrom | 356/5 |
| 3,745,527 | 7/1973 | Yoshimura | 209/111.6 |

Primary Examiner—T. H. Tubbesing
Assistant Examiner—S. C. Buczinski
Attorney, Agent, or Firm—Lindenberg, Freilich, Wasserman, Rosen & Fernandez

[57] ABSTRACT

A scene is scanned with several different frequency light beams, emitted for example, from a mixed gas laser. The scattered light returned from the surfaces of the objects in the scene is detected. Comparing the phase of the returned light with the emitted light provides range information. The amplitudes of the signals of the various different frequency light beams are logically combined to provide the color at each point of the various surfaces within the scene. From the combined range and color information machine analysis of the scene can be made so that the objects in a cluttered scene can be recognized by the machine.

5 Claims, 3 Drawing Figures

COMBINED RANGING AND COLOR SENSOR

BACKGROUND OF THE INVENTION

This invention relates to a system for determining the range and color of objects within a scene using laser light, and more particularly to improvements therein.

The recognition of three-dimensional objects in a complex cluttered scene by machine, is one of the major goals in present machine intelligence research studies. Many potential applications for industrial automation, and for deep sea and planetary exploration, have been suggested, and await an economic solution.

The general problem of recognizing objects in a cluttered scene is greatly complicated because of various factors. One of these is occlusion wherein only parts of objects may be visible, the remaining parts being hidden from view by parts of other objects. Another problem is caused by shadows, since it is often difficult to discriminate between shadows and the real objects. Other problems are caused by highlight reflections of light from portions of surfaces of an object.

The color of a surface detected by the human eye or a TV color camera depends not only on the material characteristics of the surface viewed, but also on the spectral and spatial distribution characteristics of a light falling on the surface. Although there may be considerable prior knowledge, it is generally true that lighting conditions in a scene are highly variable and unpredictable. Thus, a surface may appear to have a different "color" when viewed under incandescent lamps, fluorescent or daylight lighting; the situation can be even further complicated when multiple sources of light are present, such as in a room illuminated by both artificial and natural light sources, or by several light sources of any kind with different spectral outputs.

The intensity of light falling on every point of the surface of an object is highly variable, depending on the position of each such point relative to the position and spatial distribution of light from each light source. Many picture processing techniques designed to extract relevant features that are based on discontinuities in intensity are plagued with the wide variations and intensity encountered in regions which do not have discontinuities. Thus, it would be advantageous to use a known and controlled light source to provide the light for scanning the scene, eliminating spurious discontinuities. Furthermore, regions in the scene which have no three-dimensional discontinuities, such as planar regions (e.g., wall or floor) can be extracted using range data, even though there may be many colors present in that region. Thus, range data combined with accurate color data can be used to describe surfaces precisely. Such descriptions form the bases of improved recognition systems for objects in cluttered scenes.

OBJECTS AND SUMMARY OF THE INVENTION

An object of this invention is the provision of a combined ranging and color sensing system which eliminates the problems previously specified.

Yet another object of this invention is the provision of a ranging and color sensing system which simplifies the recognition of objects in a cluttered scene.

Yet another object of this invention is the provision of a novel and improved combined ranging and color detecting system.

The foregoing and other objects of the invention may be achieved in an arrangement wherein a light source such as a mixed gas laser is provided which can emit a number of spectral lines simultaneously. By way of illustration, three of the emitted wave lengths are used. The emitted light is passed through an amplitude modulator, then through a half-silvered mirror, which is followed by a mirror which provides a scanning action for scanning a scene. The light which falls upon the objects of the scene is scattered and returned to the half-silvered mirror, which reflects a portion thereof onto a color separating prism. Three different colored reflected beams are converted to three different electrical signals. The phase of one of these is compared with a reference phase signal derived from the initial laser illumination to determine the range of the object from which the light has been reflected. The amplitudes of the other signals are logically combined for providing color information. The range and color information may be processed to derive special features from the scene, that may be compared with those stored previously whereby recognition and/or identification of the objects in the scene may be achieved.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
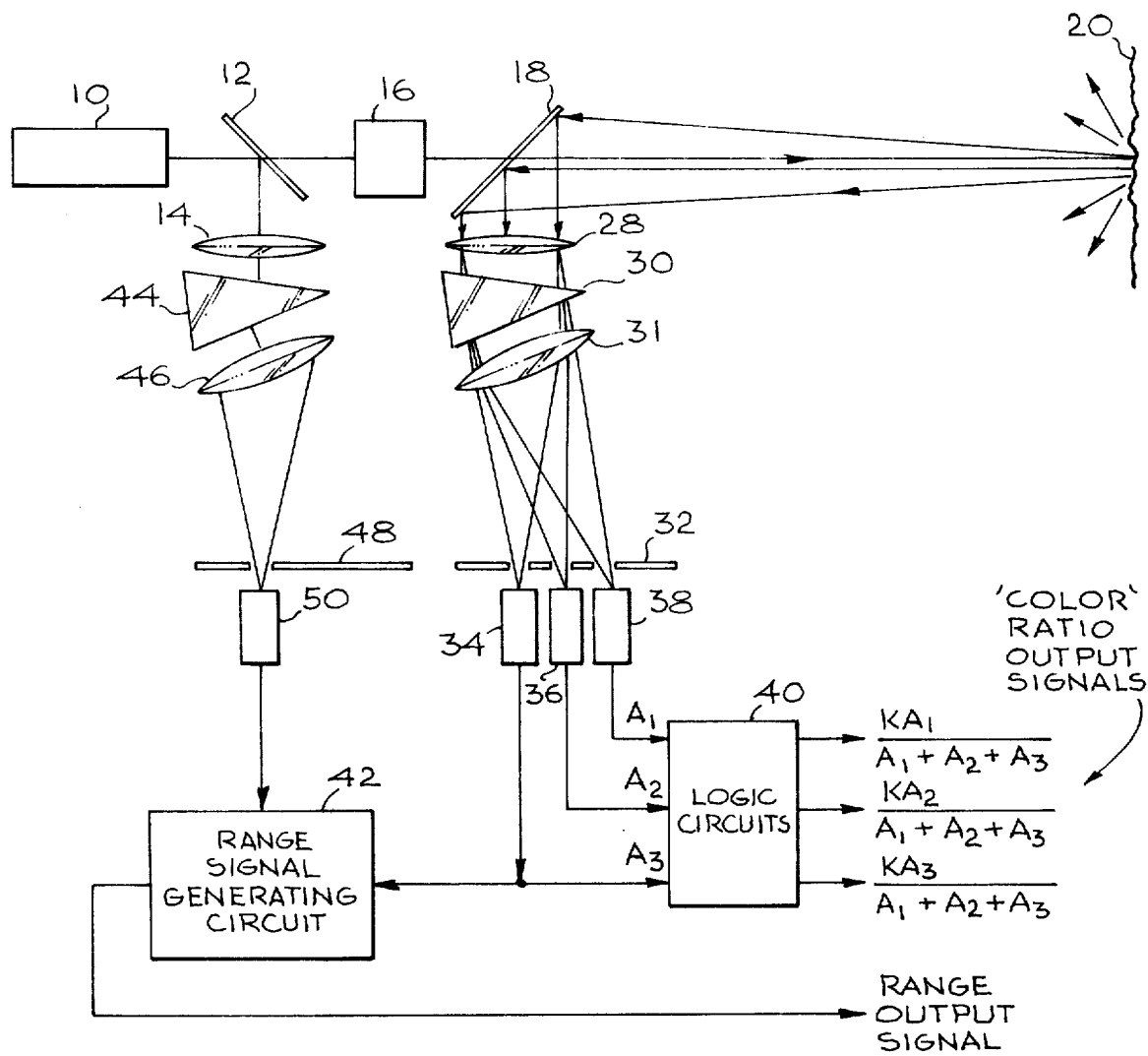
FIG. 1 is a schematic drawing of an embodiment of the invention.

Referring now to FIG. 1, there may be seen a schematic drawing of an embodiment of the invention.

At the outset, it should be stated that the principle of computing the distance or range of an object using laser light is well known. In order to obtain range readings with distant objects, usually, some type of a retroreflector is employed. However, if the range desired is restricted to a distance, on the order of under 30 feet, retroreflection can be dispensed with altogether and reliance can entirely be had on scattered light from the surfaces of objects to provide sufficient return signals. Most surfaces will absorb no more than 90% of incident light, the scattered light comprising at least 10% of the incident light. Without the use of the retroreflector only a small fraction of the back scattered light is available. However, at small ranges, sufficient scattered light flux can be collected to yield a measurable signal. The signal-to-noise ratio is optimized by using narrow band electric filters centered around the 10 megacycle modulation frequency and optical filters to accept only the narrow band of the emitted light from the laser. (A 10 angstrom band width is easily obtainable).

In FIG. 1 a mixed gas laser 10 is employed, which can emit a number of spectral lines simultaneously over the band of 400 to 700 nanometers (from blue to red). By way of illustration, only three of the wave lengths will be used. The light output of the laser will be directed at a half-silvered mirror 12, which directs some of the light down at a lens 14, and the remainder of the light passes through the mirror to impinge upon a light amplitude modulating device 16. Devices of this type are well known, and need not be described in detail here.

Figure 2:
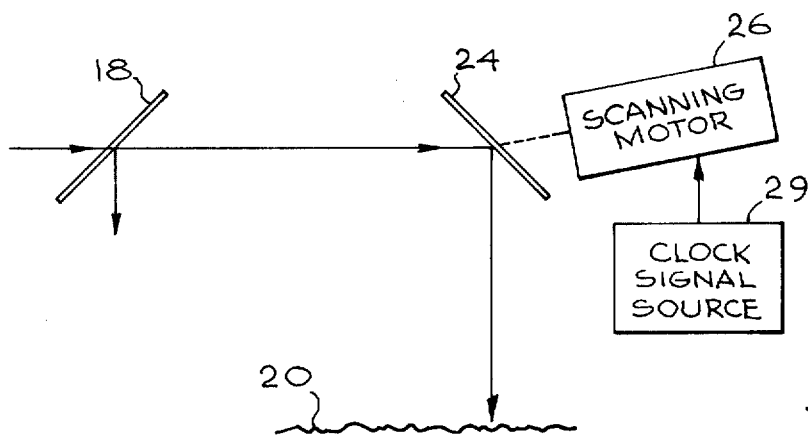
FIG. 2 is a schematic drawing showing how the light emitted by the laser source is used to scan a scene.

The output of the amplitude modulator is directed at another half silvered mirror 18. The light that passes therethrough, is directed at the region 20 to be scanned. By way of simplification, the scanning mirror which is employed so that the light can scan the region systematically, is not shown in FIG. 1. It is shown, however, in FIG. 2 and comprises, by way of example, a mirror 24, which is driven to provide a scanning motion by a suitable scanning motor 26. The scanning motor is driven in response to signals from a clock signal source 29. Mirrors mounted and driven to provide a raster scan are well known in the television art.

The light reflected from the scattering surface is redirected back at the half silvered mirror 18, which directs it onto a collecting lens 28. The lens directs the light at a color separating prism 30. The prism breaks the light up into its various components each component of the light, as is well known coming out of the prism at a different angle. A focussing lens 31, collects the light emitted by the prism and directs it at a slitted mask 32. The mask has slits positioned at locations whereby only the desired light colors will pass therethrough, the others will be blocked by the mask.

At the far side of the mask there are provided three photomultipliers, respectively 34, 36, 38. These photomultipliers convert the respective light signals into electrical signals whose amplitude is a function of the amplitude of the scattered light which has been collected. The output of the photocells are applied to logic circuits 40, details of which are provided in FIG. 3. The output of these logic circuits constitutes three signals, respectively $$\frac{KA_1}{A_1 + A_2 + A_3}, \frac{KA_2}{A_1 + A_2 + A_3}, \text{ and } \frac{KA_3}{A_1 + A_2 + A_3}.$$

These three signals may be designated as normalized color ratio output signals.

A predetermined one of the three electrical signal outputs from the photocells, for example, the one from photocell 34, is also applied to a range signal generating circuit 42. The range signal generating circuit, as previously indicated, is the well known circuitry which takes the light reflected from the surface and compares it with light from the primary light source which light was directed at that surface by the laser. From the phase differences between these two light signals a signal is derived which is representative of the distance of the surface from the laser source. It was previously pointed out that the light from the half silvered mirror 12 was directed at a collecting lens 14. The output of this lens is directed at another color separating prism 44, and its output is directed at a focussing lens 46. The focussing lens output is directed at a slitted mask 48 which has a slit opening only at the location of the light whose color corresponds to the color of the light selected for application to the range signal generating circuit 42. The light that passes through the mask 48 is applied to another photomultiplier 50, whose output constitutes the second input for the reference signal input to the range signal generating circuit 42. The range signal generating circuit produces an output designated as the range output signal. This is representative of the distance between the laser and the point in the scene from which the scattered light is derived.

Figure 3:
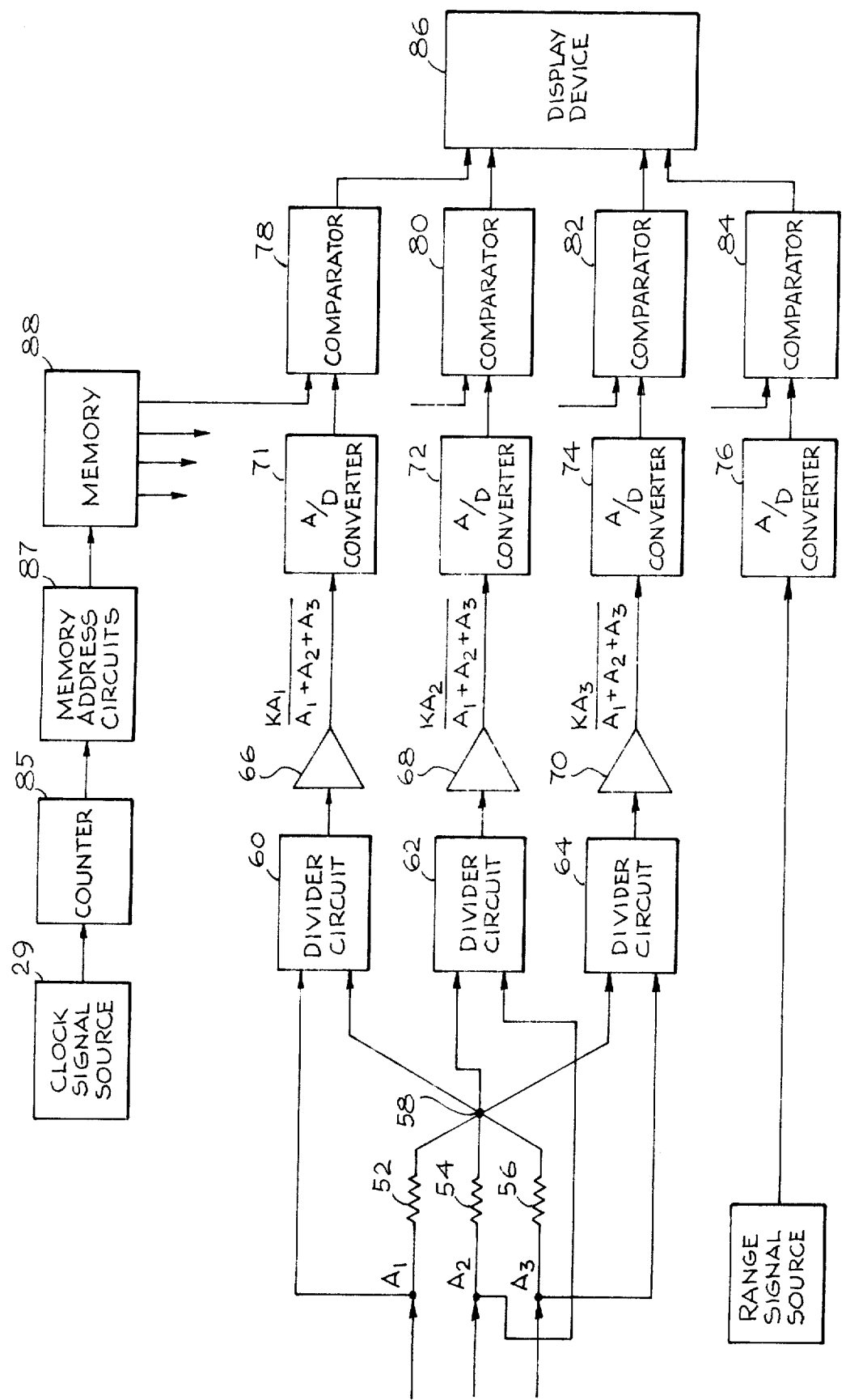
FIG. 3 is a block schematic diagram illustrating one form of the logic which may be used for converting the amplitudes of the returned scatter signals into color ratio output signals.

FIG. 3 is a schematic drawing showing one arrangement for the logic circuits, followed by a schematic drawing illustrative of one way in which the color ratio output signals and the range signal source may be used. The output signals from the photomultipliers 34, 36, and 38 are respectively designated as signals $A_1$, $A_2$ and $A_3$. These three signals are respectively applied through three summing resistors respectively 52, 54, 56, to a summing junction 58. The summing junction is connected to three respective divider circuits 60, 62, 64. These circuits are well known operational amplifier arrangements which perform a division operation on their two inputs. The second input to divider circuit 60 is the signal $A_1$. The second input to the divider circuit 62 is the signal $A_2$. The second input to the divider circuit 64 is the signal $A_3$.

The outputs of the three divider circuits 60, 62 and 64 are respectively applied to three amplifiers 66, 68, and 70. The gain of these 3 amplifiers is set to some level K so that the outputs from the respective amplifiers 66, 68 and 70 will equal the three values $$\frac{KA_1}{A_1 + A_2 + A_3}, \frac{KA_2}{A_1 + A_2 + A_3} \text{ and } \frac{KA_3}{A_1 + A_2 + A_3}$$

which are the normalized amplitude ratios of the three light frequencies. From these three signals the color of the surface in a scene from which the light is reflected is determined. Each different color will provide a different set of values for these three terms. These values may be digitized and stored for subsequent comparison and identification purposes. The range signal provides an indication of object continuity—a sharp change in range indicating a surface discontinuity. Thus, color and range can provide object recognition data.

It should be noted that in accordance with this invention, a multimode light source is employed which emits several different wave lengths of light simultaneously. These light beams are passed through the same optical system and thus traverse near-identical paths to the scattering surface and return. The amplitudes of the returned light beams are a function of the intensity of the emitting source, the range, the absorption of the medium through which the light passes, the angle of incidence on the scattering surface and the absorption and reflection characteristics of the material comprising the scattering surface. This invention isolates the absorption and reflection characteristics of the material comprising the scattering surface since this can provide a "signature" of the surface to aid in identification of the object which contains that surface.

If the intensity for each emitted wave length is maintained constant, then the ratios of the relative amplitudes of the returned light beams, to a first order of approximation, should be independent of the range, angle of incidence and the absorption of the intervening medium, but will directly measure the relative absorption and scattering of points on the scattering surface at different wave lengths, thus providing spectroscopic characteristics which are unique for each material.

Referring back now to FIG. 3, by way of example of a simple recognition system, but not to serve as a limitation upon the invention, one arrangement for utilizing the information provided by the color ratio output signals and the range signal would be to convert the outputs from the respective amplifiers 66, 68 and 70, which are analog signals, to digital form and then to compare these with the information stored previously to determine the recognition of an object viewed in the scene. This can be accomplished by applying the outputs with respective amplifiers 66, 68 and 70 to three A to D converters respectively 71, 72 and 74. The range signal source output can also be applied to an A to D converter 76, if it is not already in the digital form. The outputs of the respective converters 70 through 76 are respectively applied to comparators 78, 80, 82 and 84. The outputs from the comparators, when an identity is achieved, may be applied to a display device 86 to indicate the occurrence of the identity.

The second input to the respective comparators 78 through 84, may be derived from a computer memory, for example, 88. The clock signal source 29, which drives the mirror 24 which provides the scanning raster function, has its output applied to a counter 85. The output of the counter drives the memory address circuits 87, whose output is used to address the memory 88. Synchronism between the scanning of the scene or scattering surface 20 by the mirror 24 and the read out of the memory 88, is achieved by the use of the common clock signal source, by always starting the scanning mirror from the same location when it begins to scan the scene and finally, by time setting the counter 85 to a constant starting count.

The system described yields, for every point in the field of view, a value of the range of that point and its color. The combined information can be analyzed, by those skilled in the art, to systematically extract identifying features which can be used to recognize objects or parts of objects in a scene.

Among some of the advantages of the system, are that because an intense light source is used as an active probe, measurements of spectral reflections and range are independent of all other light incident on the measured surfaces. It is estimated that the intensity of a 3 milliwatt laser "spot" on a surface at 10 meters is at least 1000 times the intensity due to the average intensity of light from artificial light sources. Thus measurements obtained in this manner drastically diminish the complicating effects of shadows, high lights, variability in spectral output of other illuminating sources and variations in intensity of light from other illuminating sources.

At the same time there are other important advantages with this system. For example, one can obtain "color" and range data for each element in a scene without requiring costly registration for range and color information, as is the case when separate color TV cameras and range instruments independently acquire data over the same scene. Further, to a first approximation, the relative amplitude measurements represent absolute measures of the optical absorption and scattering properties of the materials comprising the objects to be recognized, being dependent only on known wave lengths of the incident light and constant optical and electronic parameters of the system. Thus, a given surface will yield the same ratios regardless of illumination from other sources, and these ratios can be stored and used subsequently as descriptors or features of objects to be recognized by the system.

Finally, the range or depth information obtained requires no further calculation, as compared with stereo methods in which two corresponding views of a scene must be analyzed to obtain desired depth data. This information is highly valuable in dealing with occlusion, greatly simplifying the analysis required to separate or segment regions belonging to each object in the scene.

There has been accordingly described a novel, useful and simplified arrangement for scanning a scene and obtaining both the range and color of each point in said scene.

The embodiments of the invention in which an exclusive property or privilege is claimed are defined as follows:

1. A method of producing signals representative of the range and color of each spot in a scene viewed from a predetermined location comprising illuminating a scene with light from a multimode laser light source to cause said scene to emit scattered light, successively collecting the scattered light from each spot in said scene and separating it into a plurality of different color light beams, converting each of said plurality of different color light beams from each spot into a representative electrical signal, generating range signals for each spot in said scene responsive to the phase of one of said representative electrical signals, establishing for each spot relative amplitude ratios of said electrical signals to provide color ratio signals, and utilizing said range and color ratio signals.

2. The method of obtaining signals representative of the range and color of each point in a scene comprising scanning said scene with light from a multimode laser light beam to produce scattered light, collecting some of said scattered light emitted from said scene and separating said collected scattered light into a plurality of different color light beams, deriving from said scanning laser light beam a reference light beam having the same color as that of one of the light beams derived from said collected scattered light, comparing the phase of said reference light beam with the phase of the similar color light beam derived from said collected scattered light to produce resultant signals indicative of the range of each point in the scene being scanned, for each point converting said different color light beams derived from said collected scattered light into different electrical signals representative thereof, generating relative amplitude ratios of said respective different electrical signals to provide color ratio signals, and utilizing said color ratio signals and said range output signals.

3. A method as recited in claim 2 wherein said step of generating relative amplitude ratios of said different electrical signals to provide color ratio signals comprises for each spot adding all of said different electrical signals to produce a sum signal, and dividing each of the representative electrical signals for a spot by the sum signal for that spot.

4. A system for producing signals representative of the range and color of each spot in a scene viewed from a predetermined location comprising, means for generating a multimode laser light beam, means for successively scanning said scene with said multimode laser light beam, means for collecting from each spot some of the scattered light emitted from said scene in response to the illumination by said multimode laser beam, and for separating the collected scattered light into a plurality of different frequency light beams, means for deriving from said multimode laser light a reference light beam having the same frequency as one of said different frequency light beams, means for comparing the phase of said reference light beam with the phase of one of said plurality of different frequency light beams having the same frequency to produce range signals therefrom, means for converting said plurality of different frequency light beams into a plurality of representative electrical signals, means for normalizing each of said plurality of electrical signals, and means for utilizing said range signals and normalized plurality of electrical signals.

5. A system as recited in claim 4 wherein said means for normalizing each of said plurality of electrical signals comprises for each spot, means for adding the plurality of representative electrical signals to provide a sum signal, and dividing each of the plurality of representative electrical signals by said sum signal for that spot.

* * * * *